United States Patent [19]

Tagawa et al.

[11] Patent Number: 4,781,735
[45] Date of Patent: Nov. 1, 1988

[54] ENRICHMENT IN OXYGEN GAS

[75] Inventors: Taichi Tagawa, Takatsuki; Yasuto Suzu, Omihachiman; Shigeki Hayashi, Sakai; Yasumitsu Mizuguchi, Takaishi, all of Japan

[73] Assignee: Osaka Sanso Kogyo Ltd., Osaka, Japan

[21] Appl. No.: 132,288

[22] Filed: Dec. 15, 1987

[30] Foreign Application Priority Data

Dec. 26, 1986 [JP] Japan ................ 61-313151

[51] Int. Cl.⁴ .............................................. B01D 53/04
[52] U.S. Cl. ........................................ 55/26; 55/58; 55/62; 55/68; 55/75
[58] Field of Search ................... 55/25, 26, 58, 62, 68, 55/75, 66

[56] References Cited

U.S. PATENT DOCUMENTS

| | | | |
|---|---|---|---|
| 3,176,444 | 4/1965 | Kiyonaga | 55/26 |
| 3,430,418 | 3/1969 | Wagner | 55/62 X |
| 3,564,816 | 2/1971 | Batta | 55/26 |
| 3,636,679 | 1/1972 | Batta | 55/26 |
| 3,717,974 | 2/1973 | Batta | 55/58 |
| 3,738,087 | 6/1973 | McCombs | 55/58 |
| 3,788,037 | 1/1974 | Shell et al. | 55/58 |
| 3,796,022 | 3/1974 | Simon et al. | 55/25 |
| 4,326,858 | 4/1982 | Benkmann | 55/58 X |
| 4,431,432 | 2/1984 | Amitani et al. | 55/58 X |
| 4,519,813 | 5/1985 | Hagiwara et al. | 55/58 X |
| 4,566,881 | 1/1986 | Richter et al. | 55/25 |
| 4,684,377 | 8/1987 | Haruna et al. | 55/26 |

FOREIGN PATENT DOCUMENTS

| | | |
|---|---|---|
| 42-26164 | 12/1967 | Japan . |
| 48-83078 | 11/1973 | Japan . |
| 51-40549 | 11/1976 | Japan . |
| 51-40550 | 11/1976 | Japan . |
| 53-96987 | 8/1978 | Japan . |
| 53-46800 | 12/1978 | Japan . |
| 152518 | 11/1980 | Japan ............ 55/26 |
| 57-50722 | 10/1982 | Japan . |
| 58-135106 | 8/1983 | Japan . |
| 60-161308 | 8/1985 | Japan . |
| 60-161309 | 8/1985 | Japan . |
| 60-180903 | 9/1985 | Japan . |
| 61-133114 | 6/1986 | Japan . |
| 61-133115 | 6/1986 | Japan . |

Primary Examiner—Robert Spitzer
Attorney, Agent, or Firm—R. Hain Swope; Larry R. Cassett

[57] ABSTRACT

A process for separating enriched oxygen and argon from air through pressure swing adorption by using an adsorbent which is capable of selectively adsorbing nitrogen. Product gas is recovered from one adsorption column in which the adsorption step has already been completed by moving the gas to another adsorption column in which regeneration of the adsorbent by pressurization with the product gas has already been completed on the basis of pressure equalization. In this case, at the same time as the gas is being moved from the feed end of one column to the feed end of another, the gas may also be moved from the effluent end of the former to the effluent end of the latter. In this way, it is possible to stably and readily obtain an enriched oxygen gas having a lowered nitrogen content at an increased specific product and a lowered specific power consumption.

6 Claims, 10 Drawing Sheets (FIRST EMBODIMENT)

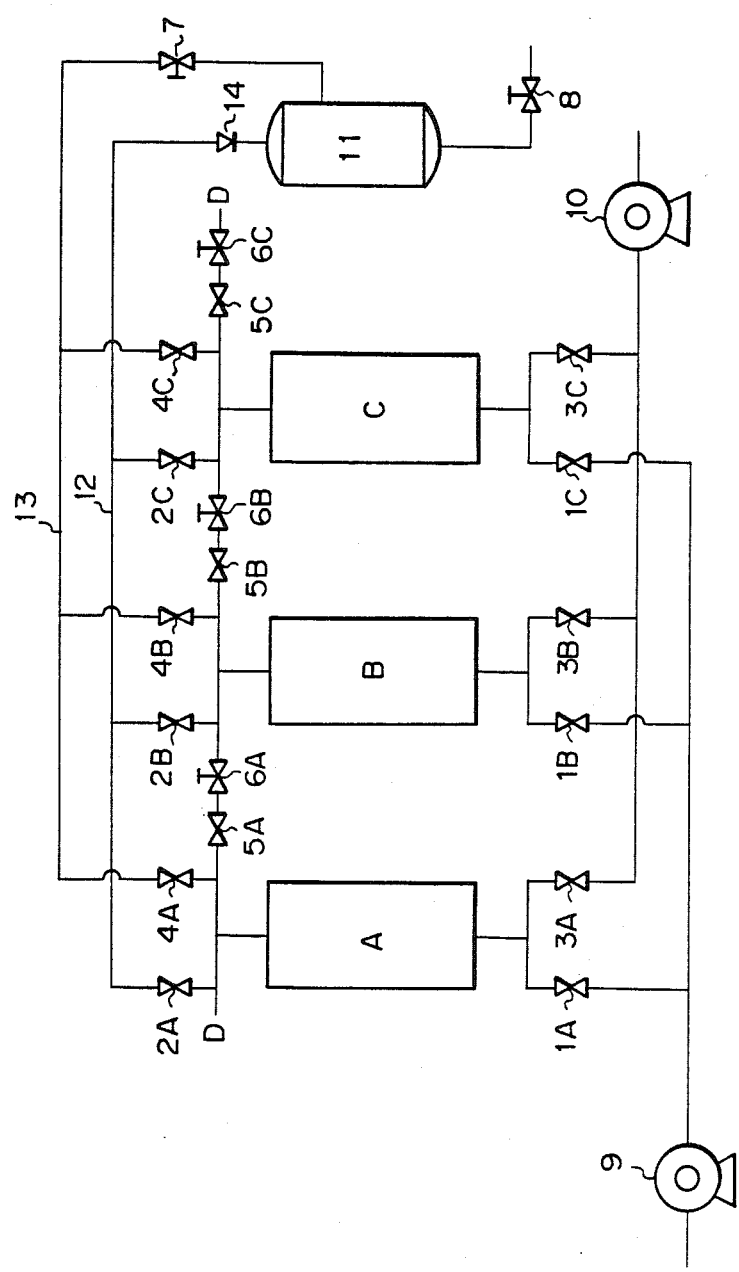

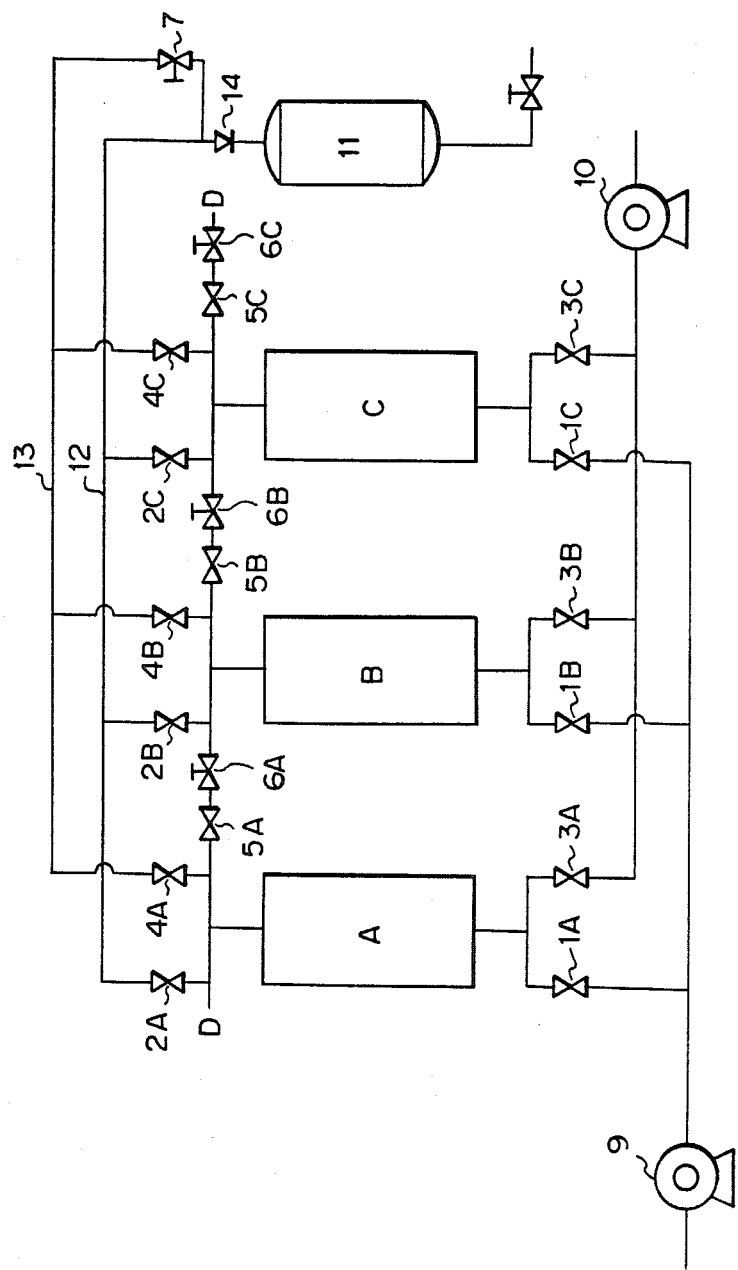
Fig. 1B (SECOND EMBODIMENT)

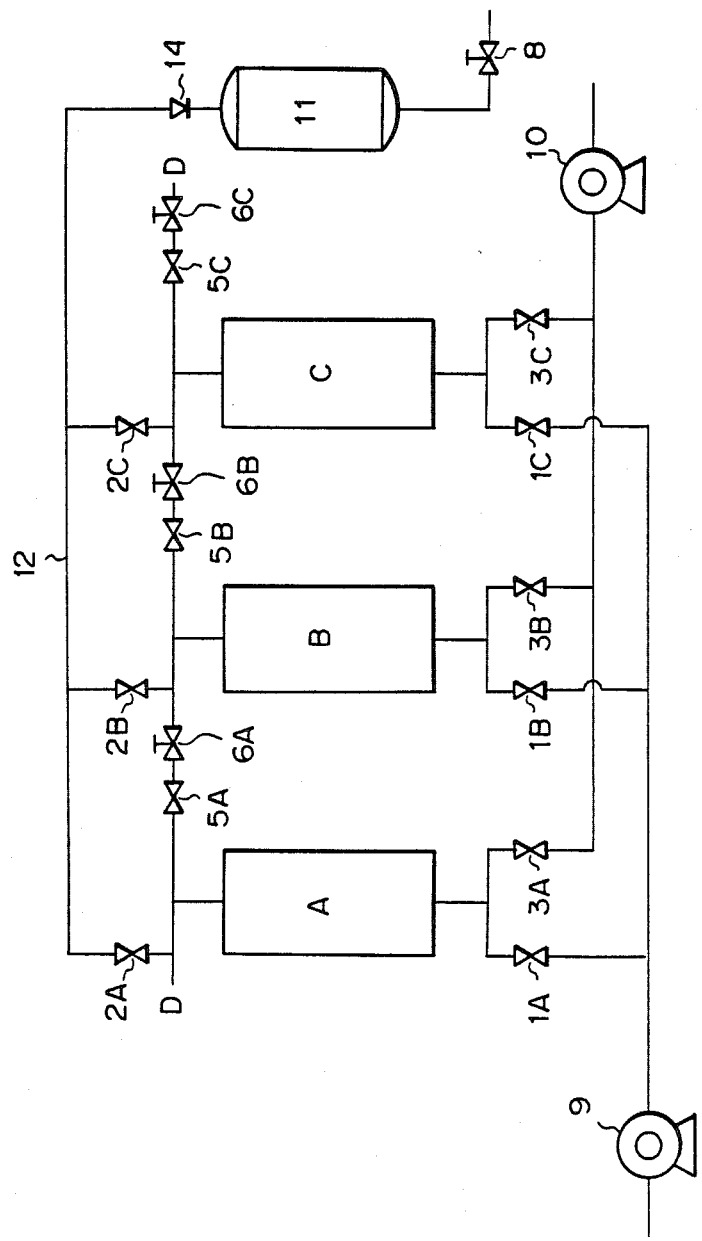

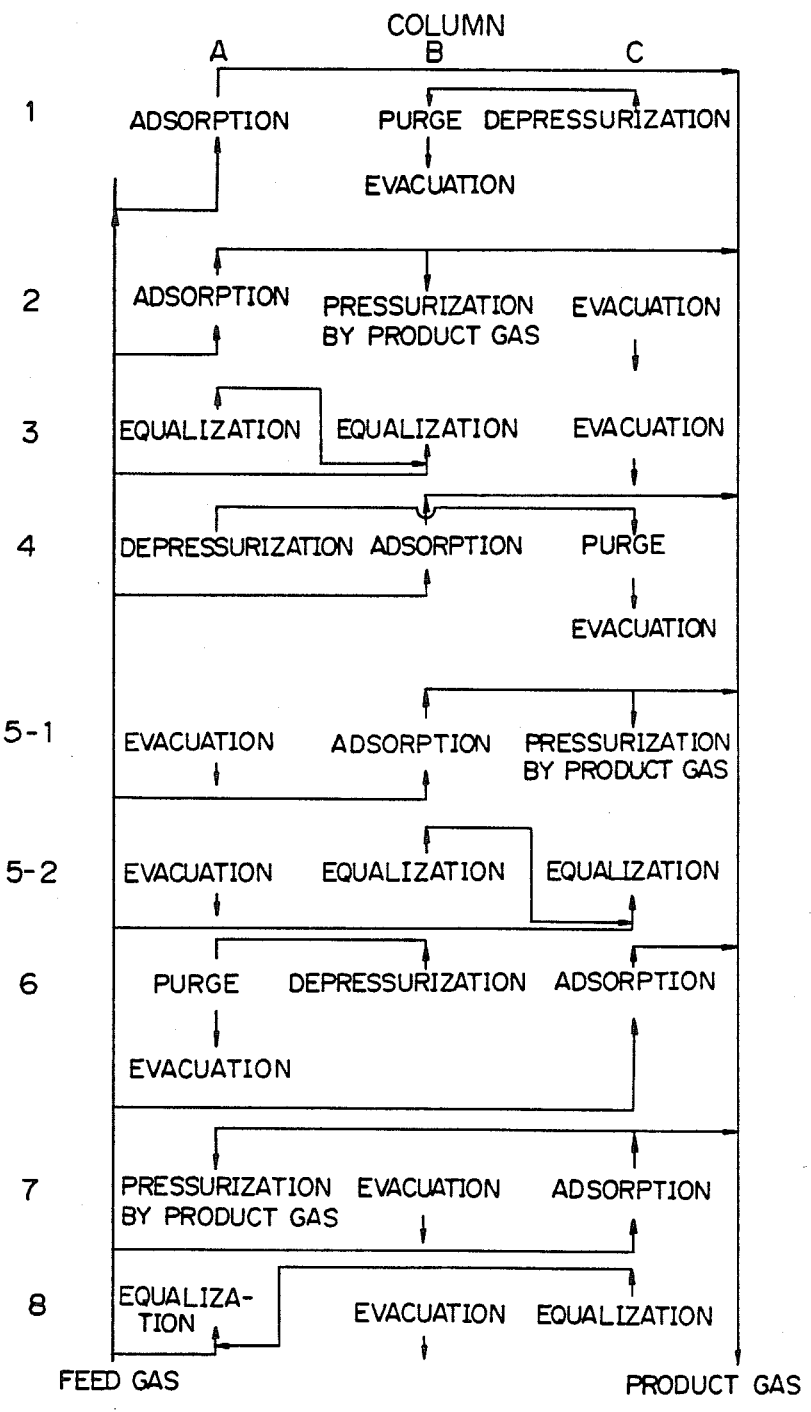

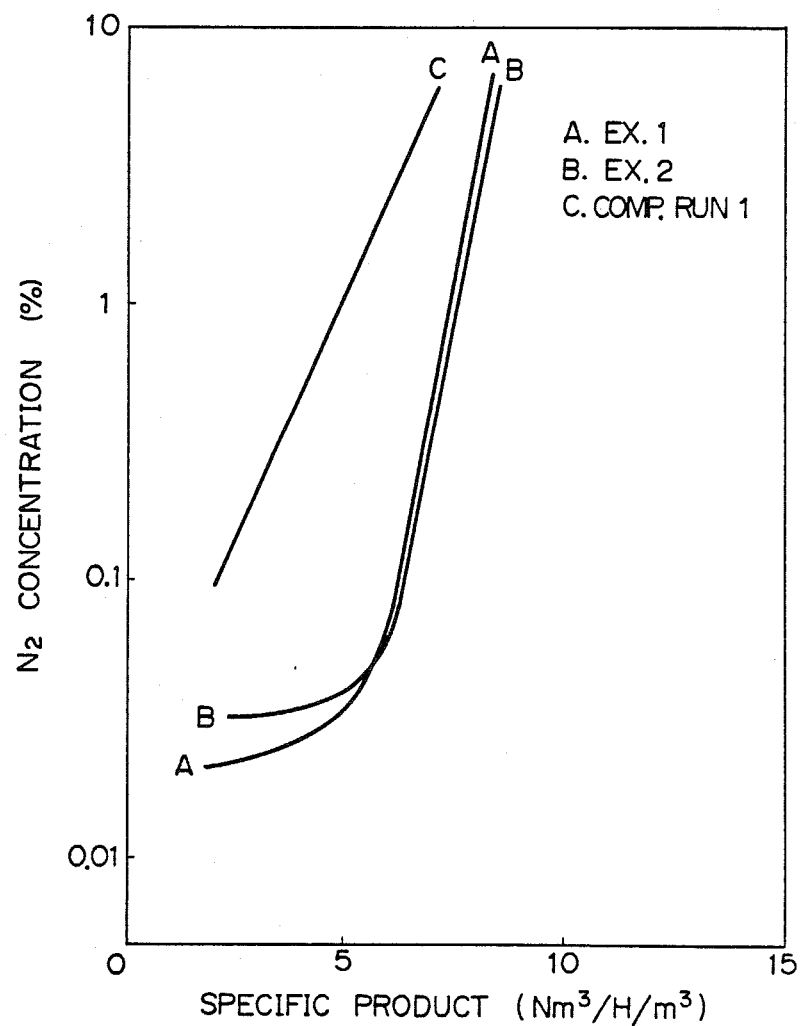
Fig. 7  N₂ CONCENTRATION V.S. SP

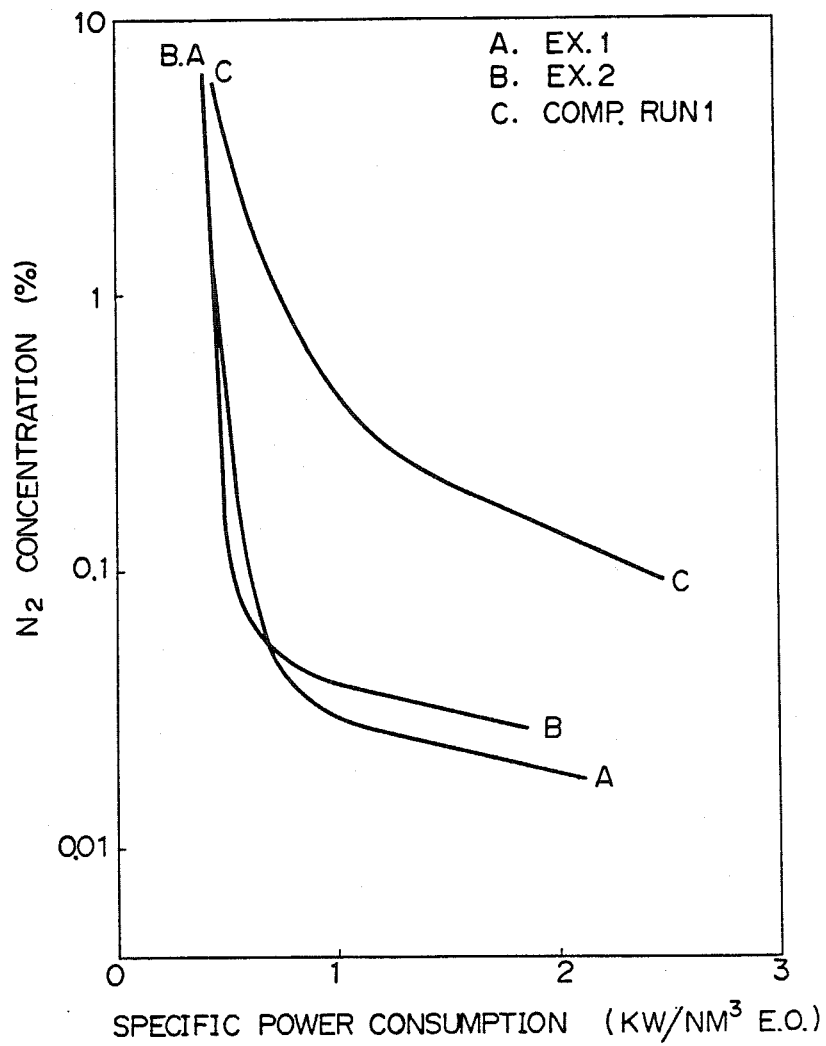
Fig. 8 N₂ CONCENTRATION V.S. SPC

ENRICHMENT IN OXYGEN GAS

The present invention relates to a process for separating enriched oxygen and argon from air through pressure swing adsorption by using an adsorbent which is capable of selectively adsorbing nitrogen.

BACKGROUND OF THE INVENTION

A great number of processes have heretofore been proposed for separating enriched oxygen from air through pressure swing adsorption by using a zeolite adsorbent which is capable of selectively adsorbing nitrogen.

One type of process is disclosed, for example, in Japanese Patent Publication Nos. 53-46800 (46800/1978) and 57-50722 (50722/1982) and Japanese Patent Public Disclosure No. 58-135106 (135106/1983). In the processes disclosed therein, adsorption is effected at a pressure of 2 kg/cm$^2$G or more, while evacuation is effected at a pressure of 200 Torr or less, and after pressurization has been effected with the product gas, the feed end of the column and the effluent end of the column after adsorption has been completed are connected together for pressure equalization, thereby advantageously realizing a high rate of recovery of oxygen and an increased amount of oxygen produced per unit amount of adsorbent (hereinafter referred to as "specific product"). On the other hand, such processes are disadvantageous that they require a high power consumption.

In Japanese Patent Publications Nos. 42-26164 (26164/1967), 51-40549 (40549/1976) and 51-40550 (40550/1976), the supply of the feed gas is suspended during the adsorption at a point where an adsorption area which has not yet been contaminated by an impurity is left at the downstream side of the adsorbent and, while cocurrent-flow depressurization is being carried out, the break-through front of impurity adsorption advances to the upper portion of the adsorption column where no impurity is absorbed, thereby taking out a product gas. Part of the product gas is introduced into a column in which regeneration of the adsorbent has already been completed, from its effluent end, thereby using the product gas for both pressurization and purging.

There are many variations in processes related to the present invention. However, since these utilize adsorption at a pressure (3 kg/cm$^2$G) higher than atmospheric pressure and purging at atmospheric pressure, they suffer from a low recovery rate and a low specific product. In addition, it is typically necessary to make frequent fine adjustment of the flow rate of the product gas introduced for pressure equalization and purging.

A group of recent applications, i.e., Japanese Patent Public Disclosure Nos. 60-161308 (161308/1985), 60-161309 (161309/1985), 61-133114 (133114/1986) and 61-133115 (133115/1986), utilize evacuation to lower the adsorption pressure and improve the specific power consumption and the rate of recovery of oxygen, but have not yet overcome all of the above-described disadvantages. In other words, these applications are basically analogous processes, that is, the supply of the feed gas is suspended during the adsorption step of a point where a portion of the adsorption area at the downstream side remains uncontaminated. As a necessary consequence, the specific product is reduced and, at the same time, it is disadvantageously necessary to effect complicated and time-consuming adjustment thereafter for lowering the pressure utilized for pressure equalization and purging.

Japanese Patent Public Disclosure No. 60-180903 (180903/1985) discloses a process which includes adsorption, evacuation and pressurization by a product gas. However, it is stated that, if purging by a product gas is not used in combination, the specific product lowers and the specific power consumption rises.

Utilization of enriched oxygen gas produced by pressure swing adsorption has recently been increasing in a great number of fields. However, the concentration of oxygen which can stably be produced by these known processes is 93% by volume, and the concentration of nitrogen as an impurity gas therein is about 2% to 3% by volume.

Accordingly, if the nitrogen concentration in the enriched oxygen gas is minimized, it is anticipated that the enriched oxygen produced by pressure swing adsorption will be used in a wider range of application.

A process for producing an enriched oxygen gas having a lowered nitrogen content is disclosed in Japanese Patent Public Disclosure No. 48-83078 (83078/1973). It is stated, however, that enriched oxygen cannot be obtained by a three-column system, and one example is given in which the nitrogen content was lowered from 0.27% to 160 ppm in a four-column system. However, since the specific product is considerably low, this process is considered economically impractical. Thus, there has heretofore been no oxygen enriching technique which enables production of an oxygen gas having a lowered nitrogen content while being satisfactory in terms of specific power consumption, specific product and rate of recovery.

SUMMARY OF THE INVENTION

In accordance with the present invention, there is provided a process for stably and readily separating an enriched oxygen or a mixed gas of oxygen and argon having a low nitrogen content from air by pressure swing adsorption a high specific product and a low specific power consumption.

The present process separates oxygen from a feed gas containing at least oxygen, nitrogen and argon by pressure swing adsorption using three adsorption columns containing an adsorbent capable of selective adsorption to nitrogen which comprises:

(i) introducing feed gas into a first adsorption column, in which step (viii) was previously completed, from its feed end to pressurize the column, and absorbing the nitrogen thereby obtaining a product gas;

(ii) introducing a portion of the product gas obtained in this step into a second column, in which the step (vi) was previously completed while continuing introduction of the feed gas to the first column;

(iii) connecting the feed end of the first column, in which the step (ii) was previously completed, to the feed end of the second column, in which step (vii) was previously completed, and introducing the gas from the first column to the second column, until approximate pressure equalization of the two columns is reached, or connecting the feed end of the first column, in which the step (ii) was previously completed, to the feed end of the second column, in which the step (vii) was previously completed, and introducing the gas from the first column to the second column, and for all or part of the equalization period connecting the effluent end of the first column to the effluent end of the second column thereby reaching approximate pressure equalization of the two columns;

(iv) connecting the effluent end of the first column, in which the step (iii) was previously completed, to the effluent end of a third column, in which the step (v) was previously completed, and introducing an amount of the gas from the first column to the third column sufficient to depressurize the first column;

(v) evacuating the first adsorption column, in which step (iv) was previously completed;

(vi) purging the first adsorption column undergoing evacuation step (v) with a definite amount of gas coming from the effluent end of the second adsorption column, in which the step (iii) was previously completed, with the effluent end of the first adsorption column being opened for the period of step (vi), the step (vi) being effected for all or part of the period of step (v);

(vii) introducing the product gas into the effluent end of the first column, in which steps (v) or (vi) was previously completed, to pressurize the first column; and (viii) introducing into the first column, in which step (vii) was previously completed, the feed gas, and at the same time connecting the feed end of the first column to the feed end of the third column, in which the step (ii) was previously completed, and introducing the gas from the third column to the first column, until approximate pressure equalization of the two columns is reached, or introducing into the first column, in which step (vii) was previously completed, the feed gas, and at the same time connecting the feed end of the first column to the feed end of the third column, in which the step (ii) was previously completed, and introducing the gas from the third column to the first column, and for all or part of the period of the above step the effluent end of the first column being connected to the effluent end of the third column to introduce the gas from the third column to the first column, thereby reaching approximate pressure equalization of the two columns; and periodically switching the flow among the adsorption columns so as to repeat the above steps in the columns.

BRIEF DESCRIPTION OF THE DRAWINGS

FIGS. 1A to 1C are flow sheets of the present invention;

FIGS. 5 and 6 are column cycles of the process of FIG. 4;

FIG. 7 is a graph showing the relationship between nitrogen concentration and specific product; and FIG. 8 is a graph showing the relationship between specific power consumption and nitrogen concentration.

DESCRIPTION OF THE PREFERRED EMBODIMENTS

Figure 2:
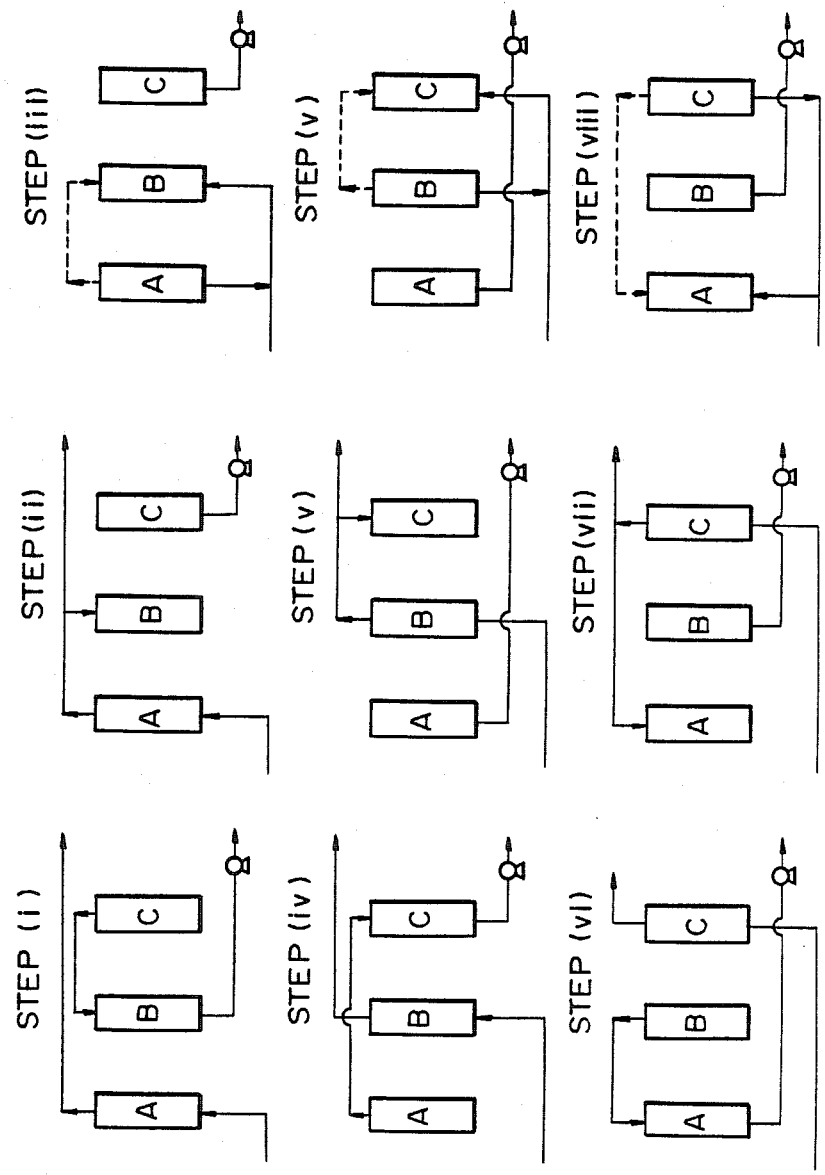
FIGS. 2 and 3 are column cycles of the present invention.
Figure 3:
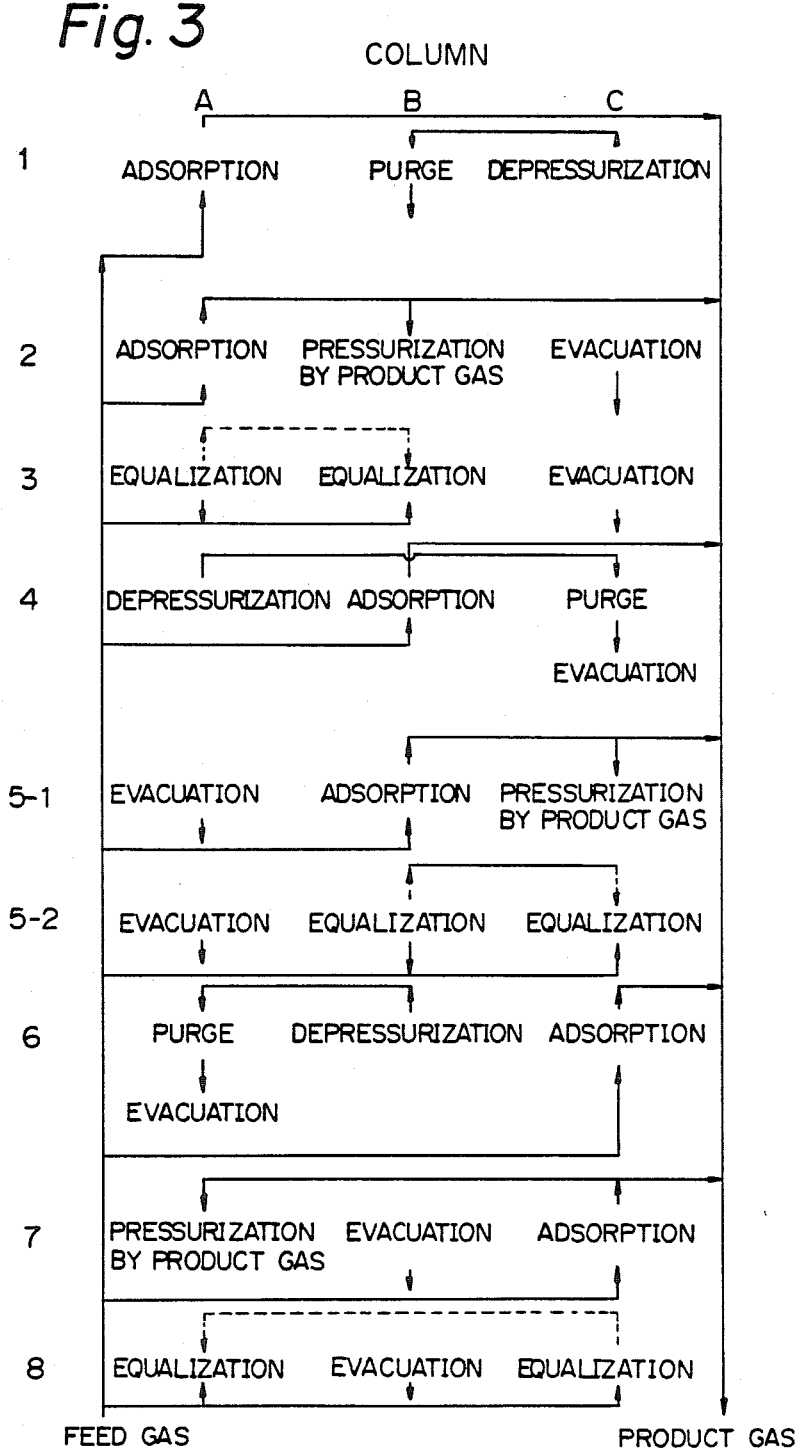

The process of the present invention will specifically be described with reference to the flow sheets shown in FIGS. 1A to 1C. It should be noted here that the following procedure is one example of the subject process and the invention is not intended to be limited thereby.

FIGS. 1A to 1C are flow sheets showing a process in which an enriched oxygen gas is continuously generated from air. Each of the three adsorption columns A, B and C contains an adsorbent capable of selectively adsorbing nitrogen. Control of each of the steps can be regulated by conventional means, e.g. a timer.

In step 1, valves 1A and 2A are opened and air, pressurized by a blower 9, is introduced to the first column A from its lower or feed end, thus causing the product gas ($O_2$ and Ar) therein to be withdrawn from the upper effluent end and introduced into a tank 11 through a line 12. During this step, the adsorption pressure in the first column A is normally maintained above atmospheric pressure up to 0.5 kg/cm$^2$G, preferably, from about 0.1 to 0.35 kg/cm$^2$G.

On the other hand, valves 3B and 5B are opened to supply enriched oxygen gas from the effluent end of the third column C to the effluent end of the second column B. The thus-introduced oxygen gas is discharged to the outside of the system by means of a vacuum pump 10 after purging the inside of the second column B countercurrently. The third column C is further depressurized by introducing the enriched oxygen gas therefrom to the second column B. The rate of supply of the enriched oxygen gas from the third column C is controlled by means of a flow control valve 6B.

In step 2, the valves 3B and 5B are closed and valves 4B and 3C are opened, thus introducing product gas from the tank 11 through line 13 to the effluent end of the second column B, which had been purged, to pressurize it. In the meantime, the first column A is continuously undergoing step 1 producing product gas from the effluent end thereof while the third column C is being evacuated by means of vacuum pump 10. The pressurization of the second column B is not necessarily effected by the supply of the product gas from the tank 11 as described above. According to another embodiment shown in FIG. 1B, part of the product gas generated from the first column A is introduced to the second column B. through the line 13 and the valve 4B after the flow rate thereof has been adjusted by means of a valve 7. According to still another embodiment shown in FIG. 1C, part of the product gas generated from the first column A is introduced to the second column B through valves 5A and 6A after the flow rate thereof has been adjusted by the valve 6A. In this case, the line 13 and the valves 4A, 4B and 4C are not needed.

In step 3, the valves 2A and 4B are closed and valve 1B is opened thereby causing the gas within the first column A, together with the feed air, to flow from the feed end of the first column A to the feed end of the second column B, and countercurrently depressurizing column A.

For all or part of this period the valves 2A and 2B may be opened to introduce the enriched oxygen gas from the effluent end of the column A to the effluent end of the column B.

At this time, it is unnecessary to control the depressurization speed. Step 3 is typically carried out for about 1 to 7 seconds. Wherein depressurization is effected only by introducing gas from the feed end of the column A to the feed end of the column B, the above-described operation is preferably carried out for about 3 to 5 seconds. Wherein gas is introduced from the effluent end of the column A to the effluent end of the column B simultaneously with the above-described depressurization, the operation is preferably carried out for only about 1 to 2 seconds.

In step 4, valve 1A is closed, valve 5C is opened causing enriched oxygen gas to flow from the effluent end of the column A to the effluent end of column C. Column C is purged countercurrently, the gas being vented from the system by the operation of vacuum pump 10.

The first column A is further depressurized while introducing the enriched oxygen gas to the third column C. At this time, the rate of supply of the purge gas from the column A to column C is controlled by means of a flow control valve 6C. Although the purge operation is essential for stably obtaining an enriched oxygen product, of low nitrogen concentration, the rate of supply of the purge gas is not critical. The rate of supply of the purge gas may be determined by the final pressure within the column which is depressurized to supply the purge gas.

In this step, the final reduced pressure within the first column A is normally set at from −6 cmHg to 0.1 kg/cm$^2$G, preferably near atmospheric pressure. During this step, the valve 2B is kept open so that product gas is flowing from the effluent end of the second column B.

In step 5-1, valve 5C is closed and valve 3A is opened to evacuate the gas from the feed end of column A by the vacuum pump 10 thereby regenerating the adsorbent by desorbing the nitrogen adsorbed therein.

In order to desorb nitrogen at a higher rate and thereby enhance the adsorbing capacity of the adsorbent, it is necessary to evacuate the first column A as much as possible, e.g., less than 100 Torr, preferably less than 50 Torr. However, according to the present invention this step is carried out at a pressure of from about 250 to 350 Torr, preferably from about 270 to 330 Torr.

While column A is being generated, product gas is being passed from the tank 11 to the effluent end of column C in which the purging step has already been completed, by closing valve 3C and opening valve 4C, thereby pressurizing column C. Simultaneously, column B is continuously undergoing step 4, and product gas is flowing out from the effluent end thereof. Part of the product gas (O$_2$) discharged from column B may be introduced to the column C.

In step 5-2, valves 2B and 4C are closed and valve 1C is opened to introduce the gas from the feed end of column B to the feed end of column C, together with the feed air, thereby depressurizing column B. Alternatively, while this operation is being carried out, valves 2B and 2C may be opened to introduce enriched oxygen gas from the effluent end of column B to the effluent end of column C. Column A is continuously evacuated during this period.

In step 6, valve 1B is closed and valve 5A is opened thereby introducing enriched oxygen gas from the effluent end of column A while purging column A countercurrently. The introduced gas is vented from the system by the vacuum pump 10. This step 6 may be carried out after the completion of the step 5 or vice versa. Alternatively, after the evacuation in step 5 has been completed, the purging in step 6 is carried out, and then evacuation is resumed.

While column A is being evacuated from its feed end by the vacuum pump 10 to desorb nitrogen from the adsorbent, enriched oxygen gas is countercurrently introduced to column A from column B by the flow control valve 6A to purge column A. Thus, in this purging operation, the enriched product gas is introduced to the column A from its effluent end so as to pass therethrough during the vacuum desorption of nitrogen, thereby lowering the nitrogen partial pressure in the gaseous phase within the column which enhances the desorbing effect. In addition, since the purging operation is effected with the pressure within column A maintained normally about 10 to 50 Torr higher than the vacuum pressure finally reached in the previous step 5-2, the power cost in relation to the vacuum pump 10 is lowered advantageously.

On the other hand, both the valves 1C and 2C may remain open during this step, so that the product gas is flowing out from the effluent end of column C.

In step 7, valves 3A and 5A are closed and valve 4A is opened to introduce the product gas from the tank 11 to the effluent end of column A which has been purged, thereby pressurizing column A with product gas. The rate of introduction of the product gas is controlled by flow control valve 7. The pressurization by the product gas is essential for stably obtaining a product gas of low nitrogen concentration (e.g., about 1000 ppm) for the following reasons. By countercurrently introducing the product gas into the effluent end of column A which is still at a vacuum pressure after the completion of the purging step, the oxygen partial pressure within column A is sucessively raised from the effluent end thereof, thereby desorbing the nitrogen gas remaining adsorbed at the effluent end of the first column A even after the completion of the purging operation and pushing down the desorbed nitrogen gas toward the feed end. In addition, even a very small amount of nitrogen is absorbed into or onto the adsorbent by returning the product gas which has once flowed out from the effluent end of column A. However, excessive pressurization by the product gas will lower the separation capability in the adsorbing step and also lower the production yield, thus unfavorably deteriorating the performance.

The final pressure within column A in this pressurization step is preferably from about 250 to 450 Torr higher than the final pressure in the purging step 6. At the same time, valve 3B is opened to evacuate column B by the operation of the vacuum pump 10 while column C is continuously undergoing step 6, with the withdrawal of product gas out from the effluent end thereof.

In step 8, valves 2C and 4A are closed and valve 1A is opened to introduce gas from the feed end of the column C to the feed end of column A, together with the feed air, thereby pressurizing column A. In step 7, column C is supplied with air from its feed end and separates nitrogen therefrom discharging an enriched oxygen gas from its effluent end. When the breakthrough front of nitrogen adsorption reaches the effluent end of column C, the adsorbing step (step 7) is completed. As a result, a relatively large amount of enriched oxygen gas, the concentration of which is lower than the oxygen concentration in the product gas but still considerably high is left in the gaseous portion at the effluent end of column C. By countercurrently depressurizing column C, the pressurized gas in the void portions thereof is depressurized and introduced from the feed end thereof to the feed end of column A until the pressure within column C lowers to become substantially equal to that in column A. At the same time, feed gas is supplied to the feed end of column A, but the introduction of the gas from the feed end of column C enables lowering of the rate of supply of the feed gas, thus increasing the oxygen recovery rate. In this step, it is unnecessary to control the depressurization speed in column C, the rate of supply of the feed gas and the pressurization speed in column A. Also, step 8 is effected within a short period of time, i.e., from about 1 to 7 seconds, perferably from about 3 to 5 seconds.

Alternatively, for all or part of the period of this step, valves 2C and 2A may be opened to introduce the enriched oxygen gas from the effluent end of column C to the effluent end of column A, thereby pressurizing column A.

The purpose of the alternative operation is to recover only an enriched oxygen gas, which remains in the gaseous phase at the effluent end of column C which has completed the adsorbing step. The oxygen concentration of this gas is close to that of the product gas recovered from the effluent end of column A. In this operation, it is preferable to prevent to the extent possible the nitrogen adsorbed in the adsorbent layer in column C from being desorbed therefrom as a result of the lowering of the pressure therein. Therefore, it is necessary to carry out the operation within a short period of time so that the nitrogen adsorbed in the adsorbent layer at the effluent end of column C will not be desorbed. If the pressure within column A is raised by introducing the gas from both the feed and effluent ends of column C to both the feed and effluent ends of column A, the pressure within column C will lower at approximately double the speed in comparison to the introduction of gas from only the feed end of column C to the feed end of column A. Therefore, it is possible to effect the operation within a shorter period of time, e.g., from 1 to 2 seconds. Accordingly, there is substantially no desorption of nitrogen from the adsorbent layer to the gaseous phase in column C. Simultaneously, column B is continuously evacuated.

The flow is periodically switched among the above-described adsorption columns so as to repeat the above steps on a cyclic basis. The product gas is continuously taken out from the tank 11 through valve 8 during the whole column cycles.

As has been described above, the present invention enables oxygen gas to be enriched and efficiently taken out as a product gas by absorbing nitrogen into or onto the adsorbent. More specifically, it is possible according to the present invention to increase the specific product by effectively shifting the break-through front of nitrogen adsorption to the effluent end, i.e. the downstream end, of each adsorption column during the adsorption step. It is also possible to reduce the amount of required feed gas by shifting the gas remaining in a column, in which the adsorption step has already been completed, to another column for recovery. Further, it is possible to lower the adsorption pressure and raise the vacuum pressure by combining purging and pressurization by the product gas. Thus, it is possible to provide a process for readily obtaining an enriched oxygen gas having a reduced nitrogen content at a lowered specific power consumption and an increased specific product.

Generally speaking, in pressure swing adsorption, pressurization and depressurization are alternately repeated and a gas is separated by the difference between the adsorbed gas content and the desorbed gas content. Methods for carrying out pressure swing adsorption may roughly be divided into three types: a first type utilizing compression to a pressure above atmospheric pressure i.e., the pressure employed therein ranges from a plus pressure to a minus pressure; a second type utilizing only compression to above atmospheric pressure; a third type utilizing only evacuation to below atmospheric pressure. However, since the power consumption in pressure swing adsorption is theoretically calculated on the basis of the compression ratio employed to attain a pressure more than atmospheric pressure, or that employed to raise the pressure from a minus pressure to atmospheric pressure during evacuation and since the power consumption lowers as the compression ratio decreases, the specific power consumption is minimized by adopting methods of the first type in which the pressure is changed from a plus pressure to a minus pressure and by reducing the compression ratio. In the present invention, substantially constant pressure in the step 2 is typically higher than atmospheric pressure, i.e., 0.5 kg/cm$^2$G, preferably from about 0.1 to 0.35 kg/cm$^2$G, and the ultimate pressure by evacuation (hereinafter referred to as "evacuate pressure") in the steps 5-1 and 5-2 is typically from about 250 to 350 Torr, preferably within the range of 300 Torr ± 30 Torr. Since in step 6 the purge gas is introduced during evacuation, the evacuate pressure is normally 10 to 50 Torr higher than that in the step 5-2, and it is therefore possible to further reduce the power consuption by the vacuum pump. Evacuation to a pressure lower than 200 Torr, i.e., near 150 Torr, produces an increase in the specific product, but causes a considerable increase in the power consumption of the vacuum pump, resulting in an increase in the specific power consumption, which is unfavorable from an economic point of view.

In the case where enriched oxygen is obtained from air by pressure swing adsorption, it is possible to increase the oxygen concentration to 95.5% by decreasing the specific product to a certain extent. However, a further reduction in the specific product causes the oxygen concentration to lower conversely.

This is because, utilizing a synthetic zeolite such as 4A, 5A, 10X or 13X type zeolite, or a natural zeolite as an adsorbent, the selective adsorbtion of oxygen is higher than that of argon. However, in regard to the nitrogen concentration in the separation of oxygen from air, since the selective adsorption of nitrogen is much higher than that of oxygen or argon, the nitrogen content in the product gas lowers as the specific product is decreased. In accordance with the present invention, a method has been found which lowers the nitrogen content in the product gas while minimizing the decrease in the specific product.

A first feature of the present invention is that it provides a method of recovering the gas from each adsorption column in which adsorption has been completed by moving the gas to another column in which regeneration by pressurization with product gas (step 7) has been completed until approximate pressure equalization of the two columns is reached.

The movement of the gas on the basis of pressure equalization may be effected in the following three methods: (a) the gas is moved from the effluent end of one column to the feed end of another column; (b) the gas is moved from the effluent end of the former to the effluent end of the latter; and (c) the gas is moved from the feed end of the former to the feed end of the latter. In any of the three methods, if the average oxygen concentration in the moved gas is equal to or higher than the oxygen concentration in the feed gas, the amount by which the feed gas is compressed by pressurization can be reduced, so that it is possible to increase the rate of recovery and lower the specific power consumption.

The above-described method (a) has heretofore been practiced, but is unsuitable for obtaining a product gas having a lowered nitrogen concentration since the adsorbent at the effluent end may be contaminated by nitrogen contained in the feed gas. As shown in FIGS. 7 and 8, in the case of such known method, as the nitrogen concentration in the product gas decreases, the specific product linearly decreases, and the specific power consumption increases. Further, in the method (a), as the product gas backfill pressure is increased, the specific product increases. More specifically, when the effluent end has been contaminated by nitrogen gas which has broken therethrough, it is necessary to considerably increase the product gas backfill pressure.

In method (b) in which the gas is moved from the effluent end of one column to the effluent end of another, there is the possibility that nitrogen may be passed to the effluent end of the column in which regeneration of the adsorbent has already been completed. Accordingly, in method (b) it is necessary to suspend the supply of the feed gas at a point in the adsorption step where there is a portion of the adsorptive in which nitrogen has not yet been absorbed left on the downstream side as described in Japanese Patent Publication No. 42-26164 (26164/1967). This means that the adsorbent cannot be completely used for adsorption, that is, up to its effluent end. Accordingly, it is impossible to increase the specific product, particularly, in the low-nitrogen concentration region.

In a first embodiment of the present invention, pressure equalization is effected between the feed ends of two columns, that is, the method (c) is employed. In the first case, an adsorption column which is depressurized after the completion of the adsorption step has the gas moved therethrough countercurrently and, therefore, there is no possibility that its effluent end will be contaminated by nitrogen gas. Accordingly, it is possible to satisfactorily shift the break-through front of nitrogen adsorption to the effluent end of the adsorption column, even in the adsorption step. As a result, it is possible to generate a product gas having a lowered nitrogen concentration at a high specific product.

In a second embodiment of the present invention, gas is simultaneously being moved from the feed end of one column to the feed end of another (i.e., the first case), while gas is also moved from the effluent end of the former to the effluent end of the latter. Pressure equalization (steps 3 and 8) in which the gas is moved from one column to another is therefore carried out while the feed gas is being introduced until the pressures within the two columns become substantially equal. The movement of the gas is effected for the purpose of recovering the gas in the gaseous phase which is present in the void portions in the adsorbent column and, therefore, it is particularly preferable to carry out the movement of the gas before the nitrogen adsorbed in the solid phase is desorbed therefrom. More specifically, it is preferable to effect the movement of the gas within a minimized period of time since the object of this operation is to recover only the gas which is present within the void portions in the adsorption column and also argon and oxygen which are relatively easy to desorb from the adsorbent. Accordingly it was possible in the first instance to reduce the pressure difference between two columns to 0.01 kg/cm$^2$ within about 1 to 7 seconds, preferably about 3 or 5 seconds, and in the second instance, it was possible to reduce the pressure difference to 0.01 kg/cm$^2$ within about 1 to 3 seconds, preferably about 1 to 2 seconds. Thus, it is possible to make the pressures within the two columns substantially equal within a favorably short period of time. This fact shows that it is possible to move the gas to a column in which the adsorption phase is to be effected subsequently with substianially no desorption of the nitrogen absorbed into or onto the adsorbent in the adsorption step (steps 1 and 2), and, therefore, it is possible to reduce the supply of feed gas and lower the power consumption. In addition, in the second embodiment of the present invention, the gas within the column which is depressurized after the completion of adsorption moves in a cocurrent-flow manner at the upper half of the column, while the gas in the lower half of the column moves countercurrently, so that it is possible to recover a gas having a considerably high oxygen concentration at the effluent end of the column which is pressurized without the possibility that the adsorbent at the effluent end will be contaminated by nitrogen. Thus, this is a considerably superior process in terms of all the essential factors, i.e., the specific product, the rate of recovery and the specific power consumtion. As will be clear from the curves shown in FIG. 7, which is a graph showing the relationship between the nitrogen concentration and the specific product, in the process of the present invention, the specific product decreases at a relatively low rate to a nitrogen concentration of about 0.05% (500 ppm) and, as the nitrogen concentration is further lowered, the specific product rapidly decreases. A similar tendency will be found in FIG. 8 which is a graph showing the relationship between the specific power consumption and the nitrogen concentration. More specifically, the specific power consumption rises at a very low rate to a nitrogen concentration of about 0.05% (500 ppm), and as the nitrogen concentration is further lowered, the specific power consumption rapidly rises. This shows that the process of the present invention has the capacity to produce an enriched oxygen gas having a nitrogen concentration of from about 500 ppm to 1.0%.

Heretofore, product gas has been conventionally utilized to effect purging. However, it has been found that purging using product gas provides no greater benefit than that obtained from the amount of product gas used for purging which is discharged to the outside of the system. This is critical. It has been found that the purge gas utilized in step 4 of the method of the present invention is a gas present in a column from which the adsorbed gas has already been recovered by pressure equalization and which gas has a lower oxygen concentration than that of the product gas, i.e., about 70 to 90%. This gas is, therefore, effectively employed for purging nitrogen from the adsorbent. The purging operation is effected by depressurizing the column which is to be supplied with the purge gas to a pressure near atmospheric pressure for from about 12 to 20 seconds in the case where the part cycle time is 60 seconds.

It is essential to use part of the product gas for pressurization in step 7 in order to obtain an enriched oxygen gas of high concentration and in particular, to generate a product gas having a low nitrogen concentration. As the product gas backfill pressure is increased, the specific product of the enriched oxygen gas having a low nitrogen concentration increases. It is preferable to effect pressurization by the product gas to a pressure of from about 250 to 450 Torr higher than the evacuate pressure. For example, when evacuation is effected at 300 Torr, the column concerned is pressurized to from about 550–750 Torr by effecting pressurization with the product gas to 250–450 Torr. There is thus obtained a product gas having a low nitrogen concentration at favorable levels of both specific product and specific power consumption. In general, when the product gas backfill pressure is excessively increased, the specific product increases, but the flow velocity of the feed gas within the column in the adsorption step (step 2) increases to lower the adsorption-desorption efficiency, and this leads to a lowering in the rate of recovery, resulting in an increase in the specific power consumption. On the other hand, when the product gas backfill pressure is excessibly lowered, the specific product rapidly decreases to increase the specific power consumption. Accordingly, it is not desirable to substantially lower the product gas backfill pressure or omit this pressurizing operation.

As has been described above, the process of the present invention can readily and economically be practiced to stably generate a product gas having a low nitrogen content, i.e., 1.0%, or 0.5%, or even 0.1% or less, which has not heretofore been achieved. In addition, the process of the present invention enables efficient generation of an enriched oxygen gas having a high oxygen concentration, i.e., at least 85%, typically 90% to 93% or more, which are equal to those heretofore realized.

Although the oxygen concentration and the specific power consumption have heretofore been utilized as factors for evaluating a process for producing an enriched oxygen gas by pressure swing adsorption, in the present invention the nitrogen concentration is added thereto as a factor for evaluation. Thus, the present invention is highly advantageous from the viewpoint of use of a mixed gas of oxygen and argon.

If a product gas having a low nitrogen content, i.e., 0.5% to 500 ppm, is used in a process in which the argon gas contained in the product gas is sufficiently effective in, for example, stirring, or lowering the partial pressure of the raction gas, the product gas should be evaluated as a mixed gas which is composed of argon and oxygen, and evaluation should also be made in regard to the specific power consumption. Since argon gas is generally expensive, the product gas will be valued higher when evaluation is made with the cost thereof taken into consideration.

Another factor for evaluating a process may be the specific product ($Nm^3/H/m^3$), that is, the amount of oxygen produced per unit of time per unit amount of adsorbent. Evaluated in terms of this unit, a process which has a large value in terms of the specific product exhibits good performance and enables a reduction in the size of the apparatus. The present invention is also superior in this point.

The present invention will be described hereinunder in more detail by way of Examples.

EXAMPLE 1

Three adsorption columns each having an inner diameter of 130 mm and a height of 2355 mm were prepared, and 21.8 kg of 5 A type synthetic zeolite adsorbent in bead form having a diameter of 2.5 mm was charged in each column.

The first embodiment, that is, a process wherein the recovery of the gas from the column in which the adsorption step has already been completed is effected only through the feed ends of the two columns, was tested in accordance with the above-described steps under the following running conditions: maximum adsorption pressure = 0.35 kg/cm$^2$G; evacuate pressure = 300 Torr; product gas backfill pressure = 550 Torr; final pressure in purging (depressurized side) = 700 Torr; and part cycle time = 60 sec. The results of the test are shown in Table 1.

The nitrogen concentrations shown in Table 1 were measured by PID gas chromatography. The designation "s.p." (specific product) represents the amount ($Nm^3$) of product gas produced per unit of time per unit amount of adsorbent ($m^3$), while "s.p.c." (specific power consumption) represents an electric energy (KWH) required to generate 1 $Nm^3$ c.o. of pure oxygen.

TABLE 1

| Results of Experiment in Example 1 | | | |
| --- | --- | --- | --- |
| Rate of supply of feed gas ($Nm^3/h$) | 4.56 | 6.66 | 7.11 |
| Rate of generation of product gas ($Nm^3/h$) | 0.21 | 0.54 | 0.73 |
| s.p. ($Nm^3/H/m^3$) | 2.2 | 5.6 | 7.7 |
| Oxygen purity (%) | 94.0 | 95.1 | 93.5 |
| Oxygen recovery rate (%) | 20.6 | 36.7 | 45.7 |
| Nitrogen concentration (%) | 0.02 | 0.04 | 1.80 |
| s.p.c. (KWH/$Nm^3$ c.o.) | 1.972 | 0.599 | 0.449 |

Part cycle time: 60 sec.
Gas recovery time: 5 sec.
Purge time: 17 sec.

EXAMPLE 2

The second embodiment, that is, a process wherein the recovery of the gas from the column in which the adsorption step has already been completed, is effected through the feed ends of the two columns and through the effluent ends thereof at the same time, was tested in accordance with the above-described steps using three adsorption columns which were the same as those used in Example 1 and under the same running conditions as those in Example 1. The results of the experiment are shown in Table 2.

TABLE 2

| Results of Experiment in Example 2 | | | |
| --- | --- | --- | --- |
| Rate of supply of feed gas ($Nm^3/h$) | 4.52 | 6.23 | 6.63 |
| Rate of generation of product gas ($Nm^3/h$) | 0.24 | 0.56 | 0.75 |
| s.p. ($Nm^3/H/m^3$) | 2.4 | 5.9 | 7.9 |
| Oxygen purity (%) | 94.0 | 95.0 | 93.5 |
| Oxygen recovery rate (%) | 23.8 | 40.7 | 50.4 |
| Nitrogen concentration (%) | 0.03 | 0.05 | 2.00 |
| s.p.c. (KWH/$Nm^3$ c.o.) | 1.652 | 0.654 | 0.435 |

Part cycle time: 60 sec.
Gas recovery time: 5 sec.
Purge time: 17 sec.

COMPARATIVE EXAMPLE 1

Figure 4:
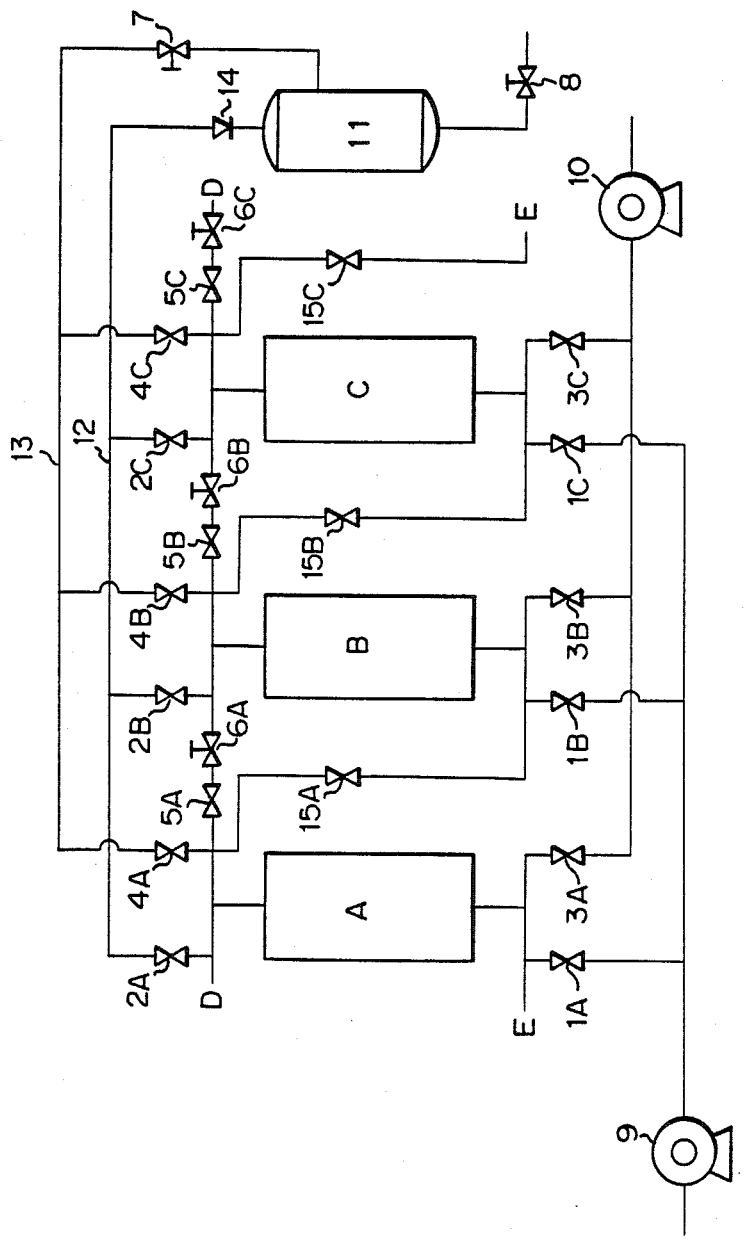
FIG. 4 is a flow sheet of a known process.
Figure 5:
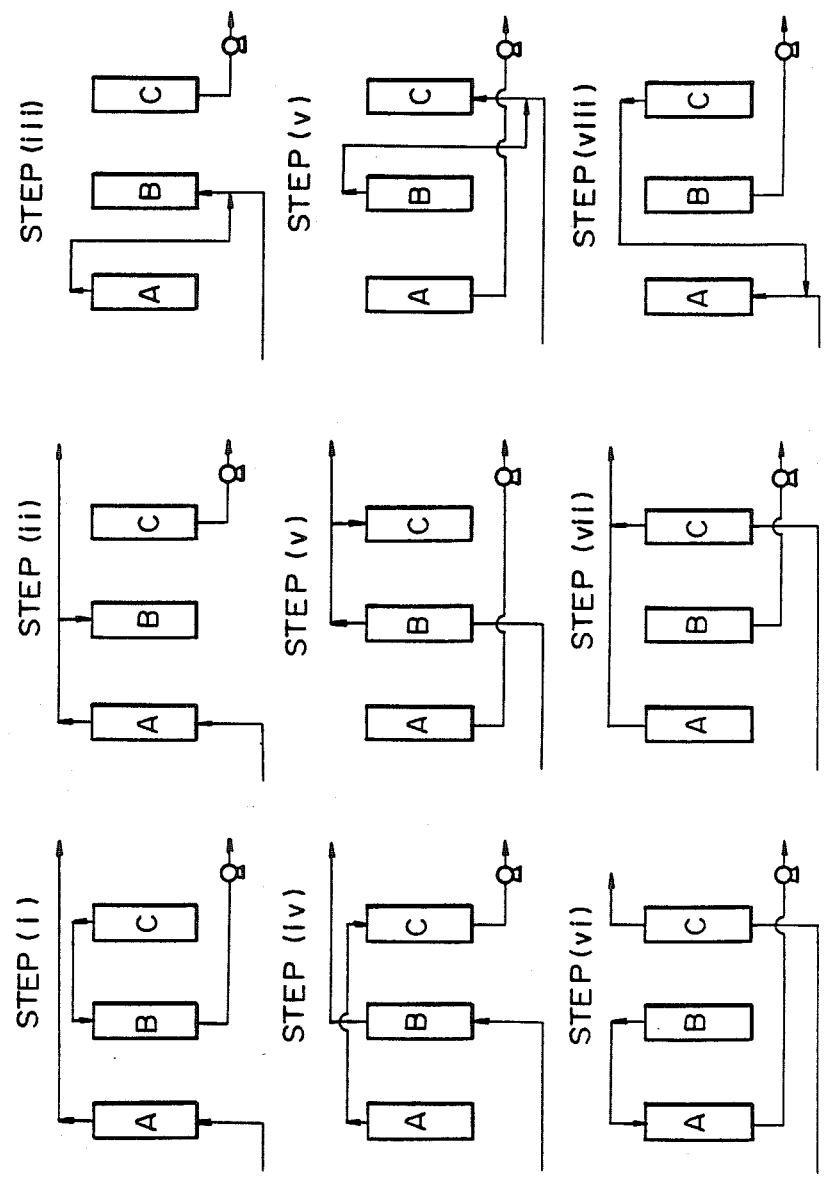

A prior art shown in FIG. 4, was tested using three adsorption columns which were the same as those used in Example 1 and under the same running conditions as those in Example 1 except that the gas in a column having been subjected to adsorption step was introduced from its effluent end to the feed end of another column to recover it. The results of the experiment are shown in Table 3.

TABLE 3

| Results of Experiment in Comparative Example 1 | | | |
| --- | --- | --- | --- |
| Rate of supply of feed gas ($Nm^3/h$) | 3.84 | 4.80 | 5.61 |
| Rate of generation of product gas ($Nm^3/h$) | 0.24 | 0.37 | 0.55 |
| s.p. ($Nm^3/H/m^3$) | 2.5 | 3.9 | 5.8 |
| Oxygen purity (%) | 94.2 | 94.3 | 93.0 |
| Oxygen recovery rate (%) | 27.9 | 34.6 | 43.4 |
| Nitrogen concentration (%) | 0.14 | 0.45 | 2.24 |
| s.p.c. (KWH/$Nm^3$ c.o.) | 1.901 | 0.987 | 0.583 |

Part cycle time: 60 sec.
Gas recovery time: 5 sec.
Purge time: 17 sec.

On the basis of the results of the experiments carried out in Examples 1, 2 and Comparative Example 1, the relationship between the nitrogen concentration and the specific product is shown in FIG. 7, and the relationship between the nitrogen concentration and the specific power consumption is shown in FIG. 8.

EXAMPLE 3

Experiments similar to Examples 1 and 2 were carried out using three adsorption columns which were the same as those used in Example 1 and under the same running conditions as those in Example 1 except that the product gas backfill pressure was changed from 550 Torr to 750 Torr. The resulting values for specific product and specific power consumption are shown in Table 4.

COMPARATIVE EXAMPLE 2

An experiment similar to Comparative Example 1 was carried out utilizing the prior art configuration shown in FIG. 4 with three adsorption columns which were the same as used in Example 1 and under the same running conditions as in Example 1 except that the product gas backfill pressure was changed from 550 Torr to 750 Torr. The resulting values for specific product and specific power consumption are shown in Table 4.

EXAMPLE 4

Experiments similar to Examples 1 and 2 were carried out in both of the first and second embodiments using three adsorption columns which were the same as used in Example 1 and under the same running conditions as in Example 1 except that the evacuate pressure was changed from 300 Torr to 150 Torr. The values for specific product and specific power consumption are given in Table 4.

COMPARATIVE EXAMPLE 3

An experiment similar to Comparative Example 1 was carried out in regard to the prior art configuration shown in FIG. 4 using three adsorption columns which were the same as in Example 1 and under the same running conditions as in Example 1 except that the evacuate pressure was changed from 300 Torr to 150 Torr. The values for specific product and specific power consumption for those experiments are shown in Table 4.

Table 4 compares the values for specific product and specific power consumption for obtaining product gases at 93% $O_2$, 0.5% $N_2$ and 0.1% $N_2$, respectively, on the bases of the results of the experiments carried out in Examples 1 to 4 and comparative Examples 1 to 3. In Table 4, "case" indicates "embodiment".

TABLE 4 s.p. and s.p.c. in Examples and Comparative Examples

| Process No. | Specific product ($Nm^3/H/m^3$) at 93% $O_2$ (A) | at 0.5% $N_2$ $\left(\frac{(B)}{(A)}\right)$ (B) | at 0.1% $N_2$ $\left(\frac{(C)}{(A)}\right)$ (C) | s.p.c. ($KWH/Nm^3$ c.o.) at 93% $O_2$ | at 0.5% $N_2$ | at 0.1% $N_2$ | Evacuate pressure (Torr) | Product gas backfill pressure (Torr) |
|---|---|---|---|---|---|---|---|---|
| Example 1 (1st case) | 7.9 | 6.8 (0.86) | 6.0 (0.76) | 0.44 | 0.50 | 0.56 | 300 | 550 |
| Example 2 (2nd case) | 8.0 | 7.0 (0.88) | 6.4 (0.80) | 0.44 | 0.52 | 0.58 | | |
| Comparative Example 1 | 5.8 | 4.0 (0.69) | 2.2 (0.38) | 0.58 | 0.89 | 2.40 | | |
| Example 3 (1st case) | 7.9 | 7.4 (0.94) | 6.8 (0.86) | 0.48 | 0.50 | 0.73 | 300 | 750 |
| Example 3 (2nd case) | 8.0 | 7.5 (0.94) | 7.1 (0.89) | 0.46 | 0.50 | 0.67 | | |
| Comparative Example 2 | 7.7 | 6.0 (0.90) | 6.0 (0.78) | 0.52 | 0.72 | 0.84 | | |
| Example 4 (1st case) | 12.8 | 11.5 (0.90) | 10.2 (0.80) | 0.58 | 0.82 | 0.96 | 150 | 550 |
| Example 4 (2nd case) | 12.9 | 11.6 (0.90) | 10.5 (0.81) | 0.57 | 0.82 | 0.92 | | |
| Comparative Example 3 | 13.2 | 11.7 (0.89) | 8.0 (0.61) | 0.61 | 0.82 | 1.48 | | |

We claim:

1. A process for separating oxygen from a feed gas containing at least oxygen, nitrogen and argon through pressure swing adsorption utilizing three adsorption columns containing an adsorbent capable of selective adsorption of nitrogen comprising:
   (i) introducing said feed gas into a first adsorption column, in which step (viii) was previously completed, from its feed end to pressurize the column, thereby absorbing the nitrogen in the feed gas and obtaining a product gas;
   (ii) introducing a portion of the product gas obtained in step (i) into a second column, in which step (vi) was previously completed, while continuing introduction of the feed gas to the first column;
   (iii) connecting the feed end of the first column, in which step (ii) was previously completed, to the feed end of the second column, in which step (vii) was previously completed, and introducing the gas from the first column to the second column until approximate pressure equalization of the two columns is achieved;
   (iv) connecting the effluent end of the first column, in which step (iii) was previously completed, to the effluent end of a third column, in which step (v) was previously completed, and introducing an amount of the gas from the first column to the third column sufficient to depressurize the first column;
   (v) evacuating the first column, in which step (iv) was previously completed;
   (vi) purging the first column undergoing evacuation with a definite amount of gas coming from the effluent end of the second column, in which step (iii) was previously completed, during which purge the effluent end of the first column is open, said step (vi) being effected for all or part of the period of step (v);

(vii) introducing product gas into the effluent end of the first column, in which steps (v) or (vi) were previously completed, to pressurize the first column;

(viii) introducing into the first column, in which step (vii) was previously completed, the feed gas, and at the same time connecting the feed end of said first column to the feed end of the third column, in which step (ii) was previously completed, and introducing the gas from the third column to the first column, until appropriate pressure equalization of the two columns is achieved; and periodically switching the flow among said adsorption columns so as to repeat the above steps.

2. The process of claim 1, wherein the column in step (i) is pressurized to a pressure of from atmospheric pressure to about 0.5 kg/cm$^2$G.

3. The process of claim 1, wherein steps (iii) and (viii) are effected for from about 1 to 7 seconds.

4. The process of claim 1, wherein in evacuation step (v), the column is depressurized to a pressure of from about atmospheric pressure to about 350 Torr.

5. The process of claim 4, wherein in evacuation step (v), the column is depressurized to a pressure of from about 250 to 350 Torr.

6. A process for separating oxygen from a feed gas containing at least oxygen, nitrogen and argon through pressure swing adsorption utilizing three adsorption columns containing an adsorbent capable of selective adsorption of nitrogen comprising:

(i) introducing the feed gas into a first adsorption column, in which step (viii) was previously completed from its feed end to pressurize the column, thereby absorbing the nitrogen in the feed gas and obtaining a product gas;

(ii) introducing a portion of the product gas obtained in step (i) into a second column, in which step (vi) was previously completed, while continuing introduction of the feed gas into the first column;

(iii) connecting the feed end of the first column, in which step (ii) was previously completed, to the feed end of the second column, in which step (vii) was previously completed, and introducing the gas from the first column to the second column, and for all or part of the equalization period connecting the effluent end of the first column to the effluent end of the second column to introduce the gas from the first column to the second column, thereby reaching approximate pressure equalization of the two columns;

(iv) connecting effluent end of the first column, in which step (iii) was previously completed, to the effluent end of a third column, in which step (v) was previously completed, and introducing an amount of the gas from the first column to the third column sufficient to depressurize the first column;

(v) evacuating the first column, in which step (iv) was previously completed;

(vi) purging the first column undergoing evacuation with a definite amount of gas coming from the effluent end of the second column, in which step (iii) was previously completed, during which purge the effluent end of the first adsorption column is open, said step (vi) being effected for all or part of the period of step (v);

(vii) introducing the product gas into the effluent end of the first column, in which steps (v) or (vi) were previously completed, to pressurize the first column;

(viii) introducing into the first column, in which step (vii) was previously completed, the feed gas, and at the same time connecting the feed end of said first column to the feed end of the third column, in which step (ii) was previously completed, and introducing the gas from the third column to the first column, thereby reaching appropriate pressure equalization of the two columns; and periodically switching the flow among said adsorption columns so as to repeat steps.

* * * * *